(12) United States Patent
Sasaki et al.

(10) Patent No.: US 9,049,329 B2
(45) Date of Patent: Jun. 2, 2015

(54) MULTIFUNCTION PRINTING DEVICE

(75) Inventors: Toshiyuki Sasaki, Suwa (JP); Yoshiki Kinoshita, Suwa (JP); Shogo Mizuyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/005,453

(22) PCT Filed: Mar. 2, 2012

(86) PCT No.: PCT/JP2012/056049
§ 371 (c)(1),
(2), (4) Date: Sep. 16, 2013

(87) PCT Pub. No.: WO2012/124613
PCT Pub. Date: Sep. 20, 2012

(65) Prior Publication Data
US 2014/0009517 A1     Jan. 9, 2014

(30) Foreign Application Priority Data

Mar. 15, 2011  (JP) ................................. 2011-056661
Jul. 1, 2011    (JP) ................................. 2011-147091

(51) Int. Cl.
| | |
|---|---|
| *B41J 29/13* | (2006.01) |
| *B41J 2/01* | (2006.01) |
| *H04N 1/00* | (2006.01) |
| *B41J 3/44* | (2006.01) |
| *B41J 11/00* | (2006.01) |
| *B41J 15/04* | (2006.01) |

(52) U.S. Cl.
CPC ............... *H04N 1/00649* (2013.01); *B41J 3/44* (2013.01); *B41J 11/006* (2013.01); *B41J 15/042* (2013.01)

(58) Field of Classification Search
CPC ................................. B41J 11/52; B41J 11/48
See application file for complete search history.

(56) References Cited

U.S. PATENT DOCUMENTS

| | | | |
|---|---|---|---|
| 5,782,567 | A | 7/1998 | Endo |
| 6,350,005 | B1 | 2/2002 | Asai et al. |
| 7,056,047 | B2 | 6/2006 | Sasaki et al. |

(Continued)

FOREIGN PATENT DOCUMENTS

| | | | |
|---|---|---|---|
| CN | 1170667 A | 1/1998 | |
| CN | 1208217 A | 2/1999 | |

(Continued)

*Primary Examiner* — Shelby Fidler
(74) *Attorney, Agent, or Firm* — Nutter McClennen & Fish LLP; John J. Penny, Jr.

(57) ABSTRACT

A small, compact multifunction printing device provides excellent ease of use with little possibility of slips and continuous paper jamming inside. The multifunction printer has a check processing unit and a continuous paper processing unit. The check processing unit has a U-shaped check conveyance path that opens to the front of the printer and enables handling slips to be processed and the processed slips from the front of the printer. A continuous paper conveyance path that conveys continuous paper fed from a paper roll in the roll paper compartment from the back to the front of the printer is formed on the inside of the check conveyance path, enabling replacing roll paper and removing processed continuous paper from the front. The conveyance paths are independent of each other, the printing positions thereof are separated, and conveyed slips and continuous paper will not interfere with each other.

8 Claims, 7 Drawing Sheets

(56) References Cited

U.S. PATENT DOCUMENTS

| | | | |
|---|---|---|---|
| 7,435,023 B2 | 10/2008 | Sasaki et al. | |
| 7,770,793 B2 | 8/2010 | Sasaki et al. | |
| 2001/0045959 A1* | 11/2001 | Hayama | 345/636 |
| 2002/0067386 A1 | 6/2002 | Asai et al. | |
| 2003/0001011 A1 | 1/2003 | Murata et al. | |
| 2004/0190970 A1* | 9/2004 | Sasaki et al. | 400/582 |
| 2004/0265032 A1* | 12/2004 | Furihata et al. | 400/693 |
| 2005/0161504 A1* | 7/2005 | Ichikawa | 235/383 |
| 2006/0198683 A1 | 9/2006 | Sasaki et al. | |
| 2006/0210342 A1 | 9/2006 | Fujikawa et al. | |
| 2009/0076921 A1* | 3/2009 | Nelson et al. | 705/16 |
| 2009/0120313 A1* | 5/2009 | Supron et al. | 101/220 |
| 2009/0317161 A1 | 12/2009 | Vo et al. | |

FOREIGN PATENT DOCUMENTS

| | | |
|---|---|---|
| JP | 10-138584 A | 5/1998 |
| JP | 2000-15872 A | 1/2000 |
| JP | 2003-1911 A | 1/2003 |
| JP | 2004-243764 A | 9/2004 |

* cited by examiner

MULTIFUNCTION PRINTING DEVICE

TECHNICAL FIELD

The present invention relates to a multifunction printing device that can print to checks and other slips and independently print to continuous paper fed from a paper roll.

BACKGROUND ART

Checks are commonly used to make deposits and withdrawals from banks. When a check is used for payment, the bank teller confirms the date, signature, and other information recorded on the check, executes the necessary deposit or withdrawal process, endorses the back of the processed check, and then gives the customer a receipt for the transaction. A driver license or some other form of identification is typically requested to verify the user when processing a check, and a photocopy of the identification may be taken and filed as necessary. This entire process must be performed in as short a time as possible many times a day at the teller window.

This process may also be handled electronically by reading magnetic information and optical information using an MICR (magnetic ink character reader) and optical scanner, and an endorsement may be printed by a printer.

Japanese Unexamined Patent Appl. Pub. JP-A-2004-243764 teaches a compact multifunction printing device (multifunction printer) that has a MICR, optical scanner, and printhead enabling checks to be processed in a single operation at the teller window. This multifunction printer has a conveyance path that transports checks and other slips, a conveyance path that conveys continuous paper for receipts perpendicularly to the check conveyance path, and a single printhead that prints on both checks and receipts where the two conveyance paths meet.

CITATION LIST

Patent Literature

PTL1: Japanese Unexamined Patent Appl. Pub, JP-A-2004-243764

SUMMARY OF INVENTION

Technical Problem

The multifunction printer taught in JP-A-2004-243764 is effective for making the device smaller and more compact than when slips such as checks and continuous paper for receipts are printed using separate dedicated printheads. However, because both slips and continuous paper are printed at the same location using a single printhead, slips and continuous paper cannot be printed simultaneously in parallel processes. In addition, because the conveyance paths for slips and continuous paper intersect at the printing position, media conveyance must be controlled so that; the two conveyance operations do not interfere with each other.

Because slip conveyance and printing, and continuous paper conveyance and printing, must therefore be performed sequentially, and checks and continuous paper cannot be processed any other way, improvement in user (teller) convenience and processing speed is limited. Slips and continuous paper also jam easily where the two conveyance paths intersect, and continuous paper and slips passing the conveyance path proximally to the continuous paper can easily interfere with each other.

With multifunction printers that print and otherwise process slips and continuous paper, slips must be loaded and removed, continuous paper must be loaded and removed, and if the printhead is an inkjet head, the ink tank must be replaced or the ink supply replenished. Improving the ability of the user way to perform such diverse operations and tasks easily and conveniently is therefore desirable.

A multifunction printing device according to the invention can process checks and continuous paper in various ways, prevent slips and continuous paper from interfering with each other or jamming on the conveyance path, and is easy to use

Solution to Problem

A first aspect of the invention is a multifunction printing device including: a slip processing unit that processes slips; a continuous paper processing unit that processes continuous paper; and a device case in which the slip processing unit and continuous paper processing unit are disposed. The slip processing unit includes an entrance pocket in which a slip to be processed is loaded, an exit pocket to which the slip is discharged after processing, a slip print unit that prints on the slip, a magnetic reading unit that reads magnetic information from the slip, an optical reading unit that reads an image of the slip, and a slip conveyance path that guides the slip fed from the entrance pocket past the printing position of the slip print unit, the reading position of the magnetic reading unit, and the scanning position of the optical reading unit in this order or a different order to the exit pocket. The continuous paper processing unit includes a roll paper compartment, a continuous paper print unit that prints to continuous paper fed for processing from a paper roll stored in the roll paper compartment, a continuous paper exit from which the continuous paper is discharged after processing, and a continuous paper conveyance path that guides continuous paper fed from the paper roll past the printing position of the continuous paper print unit to the continuous paper exit. When the device frame is set in the normal position on a level surface, one direction parallel to the level surface is the longitudinal axis, the direction parallel to the level surface and perpendicular to the longitudinal axis is the transverse axis, and the direction perpendicular to the level surface is the vertical axis. The roll paper compartment stores the roll paper with the center axis of the paper roll aligned with the transverse axis; the slip conveyance path is a conveyance path that encloses the continuous paper processing unit on both sides on the transverse axis and the back side on the longitudinal axis; and the continuous paper conveyance path is a separate conveyance path that extends from the roll paper compartment to the front on the longitudinal axis with the conveyance path width aligned with the transverse axis, and shares no conveyance path parts with the slip conveyance path.

The slip conveyance path and the continuous paper conveyance path in the multifunction printing device according to the invention are conveyance paths that are mutually independent and share no parts of the conveyance path, and respectively have a slip print unit and a continuous paper print unit. As a result, the slips and continuous paper conveyed through each can be simultaneously and independently conveyed and printed. In addition, because the conveyance paths are independent of each other, problems such as paper jams occurring where the paths intersect do not occur. Furthermore, by sufficiently separating the printing positions of the conveyance paths from each other, problems such as paper jams resulting from interference between a conveyed slip and the continuous paper can be avoided.

In addition, because the continuous paper processing unit is enclosed by the slip conveyance path on both sides on the transverse axis and the back on the longitudinal axis, and the slip conveyance path is not located at the front side of the printer on the longitudinal axis, the space enclosed by the slip conveyance path can be used effectively if the continuous paper conveyance path is formed extending from the back to the front on the longitudinal axis and component parts are disposed along the continuous paper conveyance path. In other words, a multifunction printing device having two independent conveyance paths can be made small and compact.

In a multifunction printing device according to another aspect of the invention, the entrance pocket and the exit pocket are both open at the top on the vertical axis; the slip conveyance path is defined by a conveyance channel of a specific depth that is open at the top on the vertical axis; the continuous paper exit opens to the top on the vertical axis; and the roll paper compartment is open to the top on the vertical axis when a roll paper compartment cover attached to the top of the device case on the vertical axis is opened.

Because the entrance and exit pockets for slips, the roll paper compartment, and the continuous paper exit are all open at the top of the printer, slips can be loaded, and removed, roll paper can be replaced, and continuous paper can be removed from the same side, specifically from above the front of the printer, without changing the orientation of the multifunction printing device, and without the user moving to or reaching around the sides or back of the multifunction printing device. Both slips and continuous paper can therefore be processed from a user-friendly position. Furthermore, because the continuous paper conveyance path extends to the front of the printer where the slip conveyance path is not present and the continuous paper exit is formed at this front end of the continuous paper conveyance path, paper lams caused by continuous paper discharged from the continuous paper exit interfering with a slip conveyed through the slip conveyance path that is open at the top can be prevented because the continuous paper exit can be disposed to a position separated from the slip conveyance path.

Further preferably in a multifunction printing device according to another aspect of the invention, at least one of the slip print unit and continuous paper print unit has an inkjet head. In this case, an ink tank loading unit to which an ink tank that stores ink supplied to the inkjet head is installed is preferably disposed on the device front side of the continuous paper conveyance path; and the ink tank loading unit opens to the top on the vertical axis when an ink tank loading unit cover attached to the device top is opened. This aspect of the invention enables installing an ink tank or replenishing the ink supply from the front of the printer, and thus simplifies these tasks.

Further preferably in another aspect of the invention, the roll paper compartment cover is an access cover that can open to the top on the vertical axis pivoting at the back side thereof on the longitudinal axis; the ink tank loading unit cover is an access cover that can open to the top on the vertical axis pivoting at the front side thereof on the longitudinal axis; and the continuous paper exit is formed between the edge part of the front side of the roll paper compartment cover and the edge part of the back side of the ink tank loading unit cover.

Further preferably in a multifunction printing device according to another aspect of the invention, an automatic cutter for cutting the continuous paper across the width thereof is disposed to the continuous paper conveyance path at a position between the continuous paper exit and the continuous paper print unit, enabling cutting the discharged continuous paper and producing receipts of a specific length, for example. If the drive unit of the automatic cutter is also exposed when the ink tank loading unit opens, maintenance of the automatic cutter, for example, can be simplified. Furthermore, because the ink tank loading unit cover can also be used as the cover of the automatic cutter, providing a separate cover is not necessary, and device size and cost can be reduced.

In a multifunction printing device according to another aspect of the invention, the slip conveyance path has an upstream-side conveyance path part that extends from the entrance pocket to the back on the longitudinal axis at a position on one side of the roll paper compartment on the transverse axis, a downstream-side conveyance path part that extends from the exit pocket to the back on the longitudinal axis at a position on the other side of the roll paper compartment on the transverse axis, and a rear conveyance path part that extends on the transverse axis from the downstream end of the upstream-side conveyance path part to the upstream end of the downstream-side conveyance path part at the back of the roll paper compartment on the longitudinal axis.

In this configuration, the height of the device top on the top side on the vertical axis at the part of the device case where the rear conveyance path part of the slip conveyance path is formed behind the roll paper compartment cover on the longitudinal axis is preferably set to a height that does not interfere with the roll paper compartment cover when fully open. In addition, the position of the roll paper compartment cover when fully open is preferably set to not interfere with a slip passing the rear conveyance path part.

Usability including replacing the roll paper is easier with this configuration because the roll paper compartment cover can be opened wide. Damage and paper jams can also be avoided when a slip is conveyed while the roll paper compartment cover is open because the slip will not contact the roll paper compartment cover.

When the slip conveyance path has a portion with low side walls (a shallow conveyance channel), the magnetic reading unit, slip print unit, and optical reading unit are disposed to positions removed on the transverse axis from the top of the device where the roll paper compartment cover is positioned when fully open. For example, the magnetic reading unit may be disposed to the upstream-side conveyance path part, the slip print, unit may be disposed to the downstream end part of the rear conveyance path part, and the optical reading unit may be disposed to the downstream-side conveyance path part.

Further preferably, the slip print unit and the continuous paper print unit each have a line printhead.

So that a driver license or other identification card can be read optically and magnetically when processing slips such as checks, a card slot of a specific depth extending on the longitudinal axis for a magnetic reader is formed at a part of the device case on the exterior side of the entrance pocket on the transverse axis at the top of the device on the vertical axis; and a card slot for scanning cards that feeds a card to the reading position of the optical reading unit on the downstream-side conveyance path part is formed in the top of the device to the inside on the transverse axis from the exit pocket.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a multifunction printing device according to the present invention is described below with reference to the accompanying figures. The multifunction printing device described in the embodiment below processes checks as a type of slip, and produces receipts by printing and cutting continuous paper delivered from a paper roll, but the invention can obviously also be used in a multifunction printing device that processes slips other than checks, or in a multifunction printing device that performs a process that prints and produces coupons instead of receipts.

General Configuration

Figure 1:
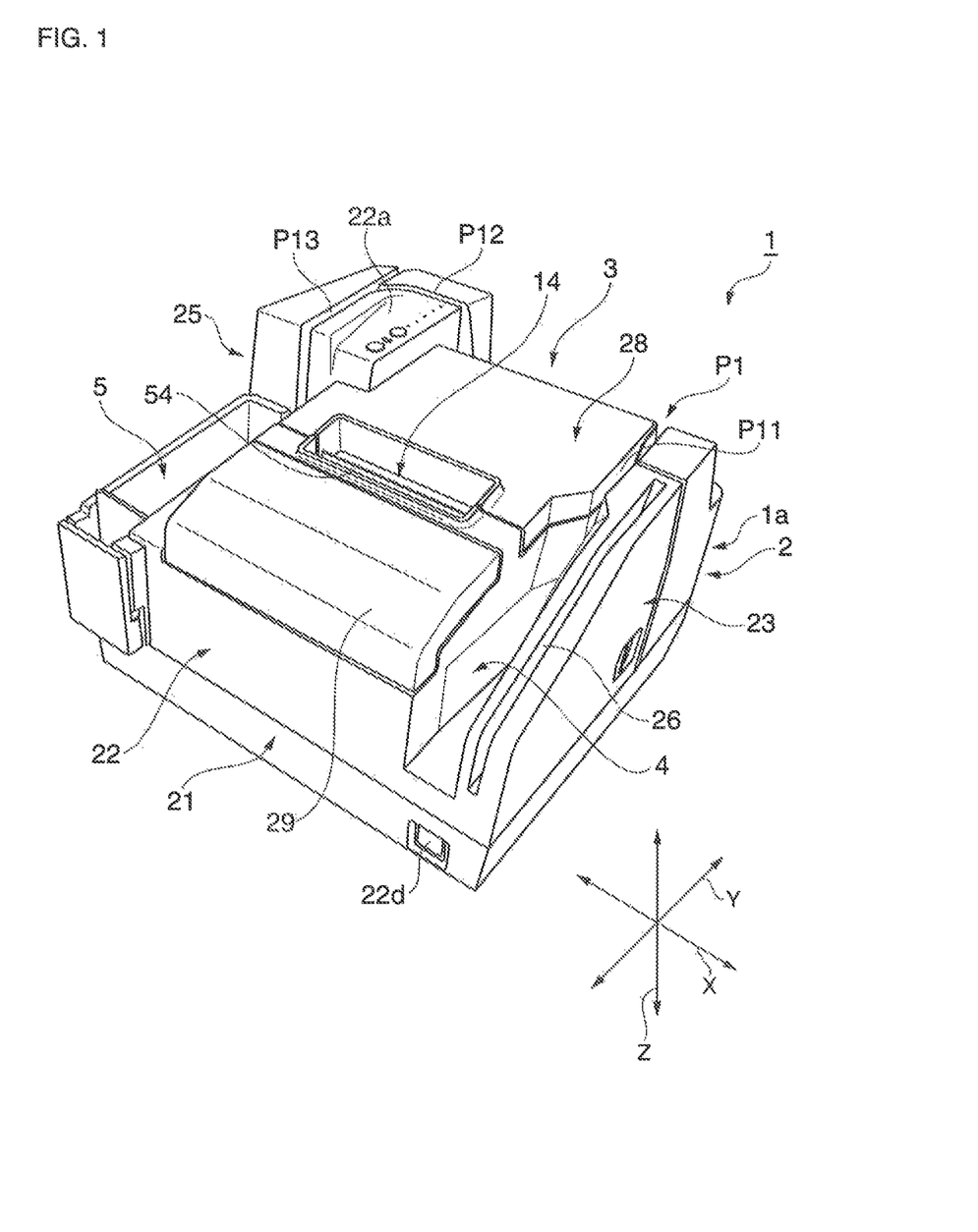
FIG. 1 is an oblique view of a multifunction printing device according to the invention.

The general configuration of a multifunction printing device ("multifunction printer" below) according to this embodiment of the invention is described next with reference primarily to FIG. 1 and FIG. 5. FIG. 1 is an oblique view of the multifunction printer from diagonally above the right side, and FIG. 5 describes the configuration of the check processing unit and continuous paper processing unit incorporated in the multifunction printer. The multifunction printer 1 houses the check processing unit 2 and continuous paper processing unit 3 inside a printer case 1a. Note that when the multifunction printer 1 is normally placed on a flat horizontal surface for use as shown in FIG. 1, the side of the multifunction printer 1 (printer case 1a) facing the operator is the front and the opposite side is the back, the direction between front and back is the longitudinal axis Y, the direction parallel to the installation surface and perpendicular to the longitudinal axis Y is the transverse axis X, and the direction perpendicular to the installation surface is the vertical axis Z.

The check processing unit 2 of the multifunction printer includes an entry pocket 4 in which one or more checks S1 to be processed are loaded; an exit pocket 5 into which checks S1 are discharged after processing; a magnetic reader 6 that reads magnetic information from checks S1; a check print unit 7 that prints on checks S1; an optical reading unit 8 that scans the front and back sides of the checks S1; and a check conveyance path P1 that is substantially U-shaped when seen in plan view. A check S1 fed from the entry pocket 4 into the check conveyance path P1 sequentially passes the reading position of the magnetic reader 6, the printing position of the check print unit 7, and the reading position of the optical reading unit 8, and is then discharged into the exit pocket 5. Note that units 6, 7, and 8 can be arranged along the check conveyance path P1 in a different order than in this embodiment.

Figure 5:
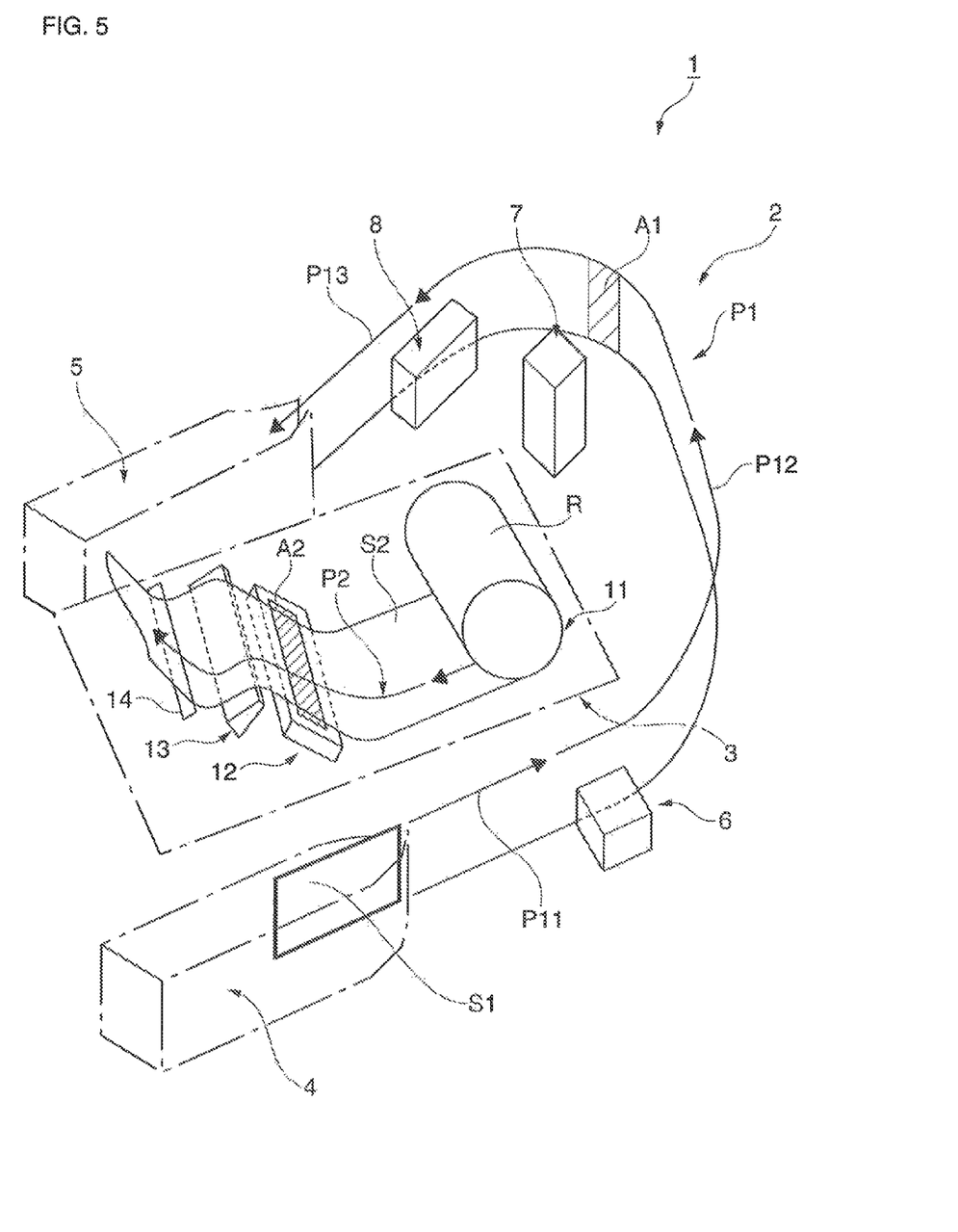
FIG. 5 describes the check processing unit and continuous paper processing unit of the multifunction printing device in FIG. 1.

The continuous paper processing unit 3 incorporated in the multifunction printer 1 is disposed within the area surrounded by the check conveyance path P1, and as shown in FIG. 5 includes a roll paper compartment 11; a continuous paper print unit 12 that prints on the continuous paper S2 to be processed that is fed from the paper coli R stored in the roll paper compartment 11; an automatic cutter 13 that cuts across the width of the continuous paper S2 after printing is completed; a continuous paper exit 14 that discharges the processed continuous paper S2 (after printing or after printing and cutting); and a continuous paper conveyance path P2 that carries the continuous paper S2 fed from the paper roll R past the continuous paper print unit 12 printing position to the continuous paper exit 14.

The check conveyance path P1 is a conveyance path formed in a U-shape when seen in plan view, creating a space in which the continuous paper processing unit 3 is enclosed on both sides on the transverse axis X and the back side on the longitudinal axis Y. The check conveyance path P1 is defined by a conveyance channel of a specific depth that is open at the top along the vertical axis Z. A check S1 is inserted to the entry pocket 4 standing on edge with the long sides on top and bottom, is conveyed through the multifunction printer 1 to the exit pocket 5 while held upright, and the checks S1 discharged into the exit pocket 5 are stored standing in a horizontal stack. Note that the continuous paper conveyance path P2 is an independent conveyance path, has no parts that are shared with the check conveyance path P1, and extends on the longitudinal axis Y with the width of the conveyance path aligned with the width of the printer.

External Appearance

Figure 2:
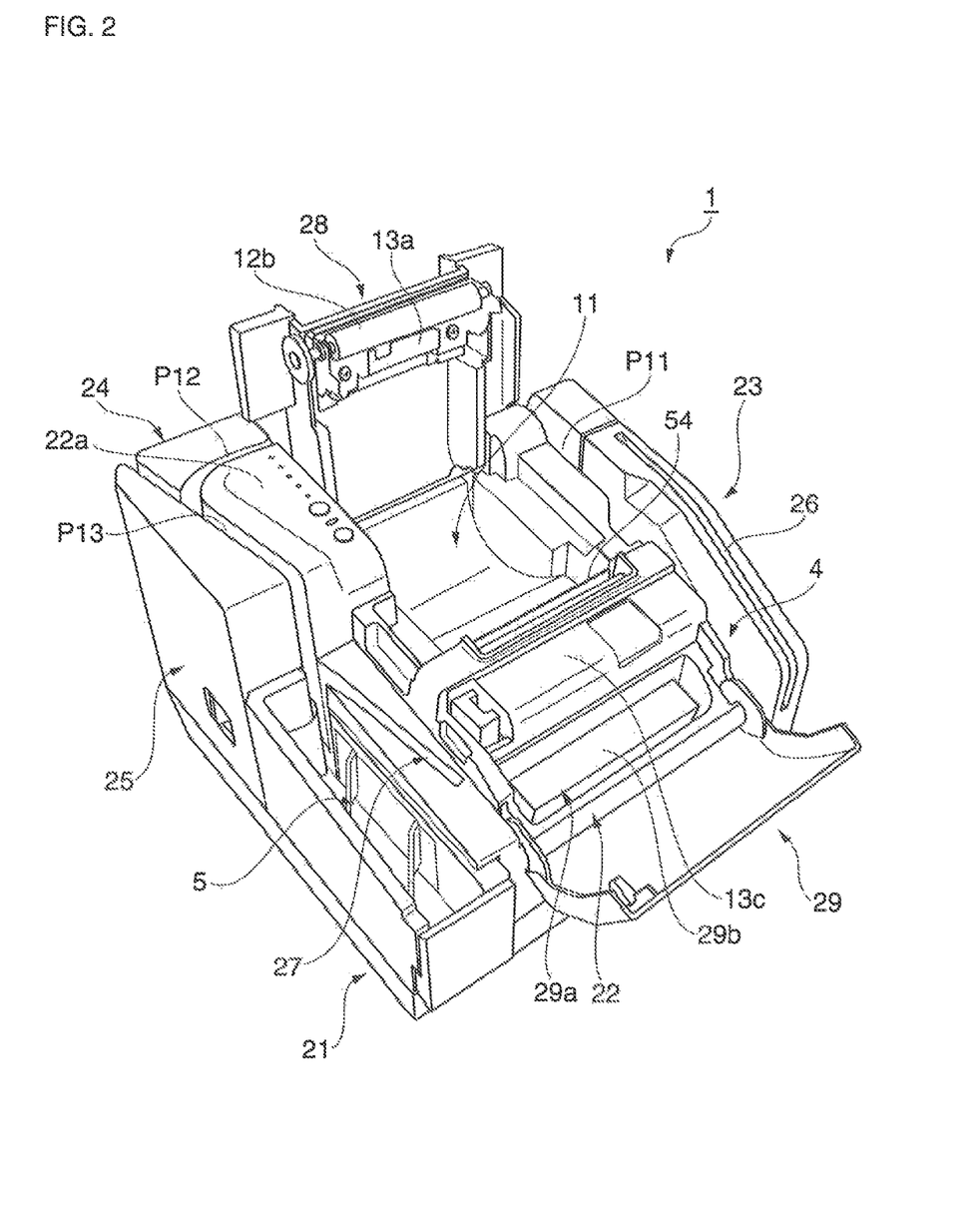
FIG. 2 is an oblique view of the multifunction printing device in FIG. 1 with two covers open.
Figure 3:
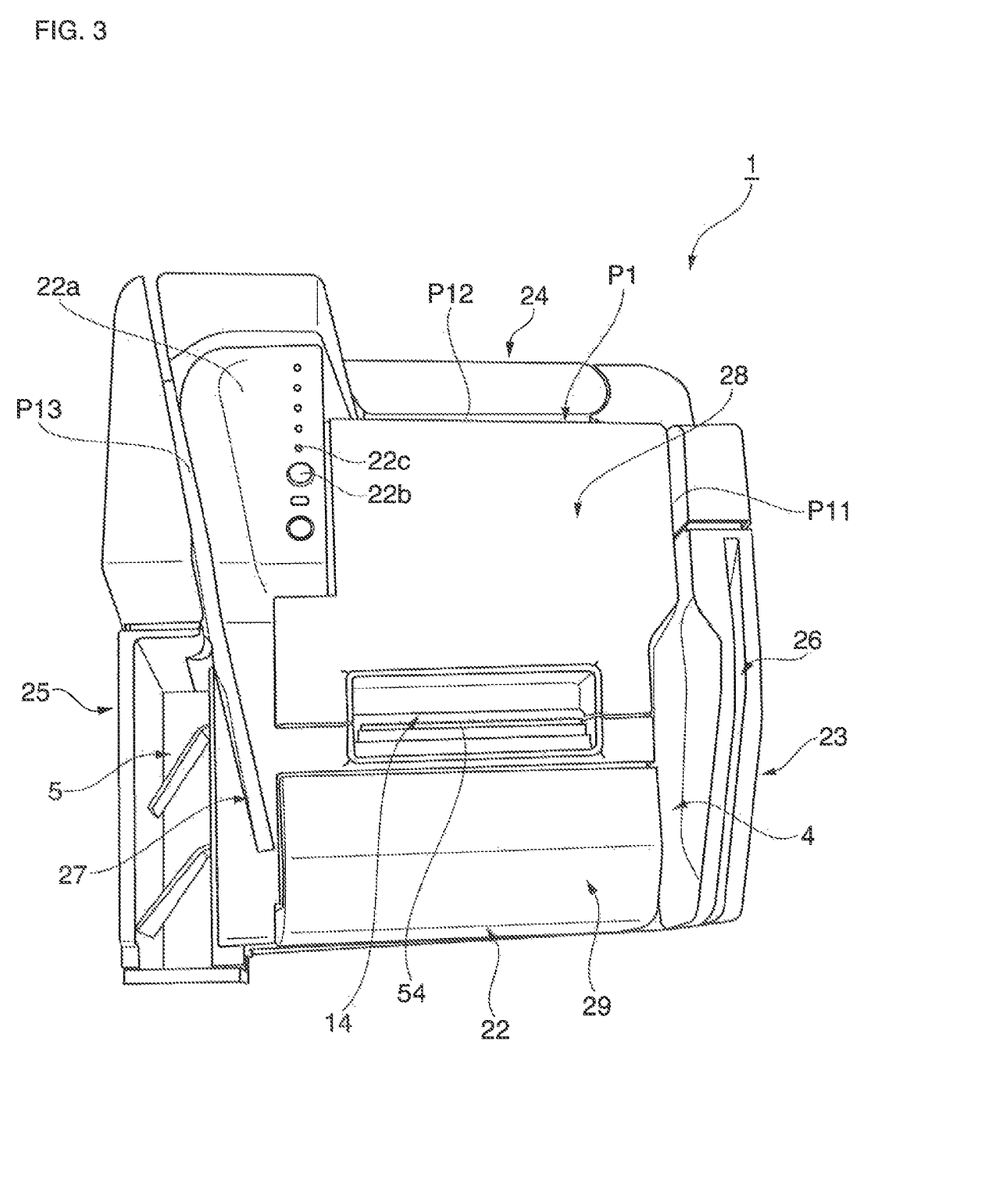
FIG. 3 is an oblique view of the multifunction printing device in FIG. 1 from above.
Figure 4:
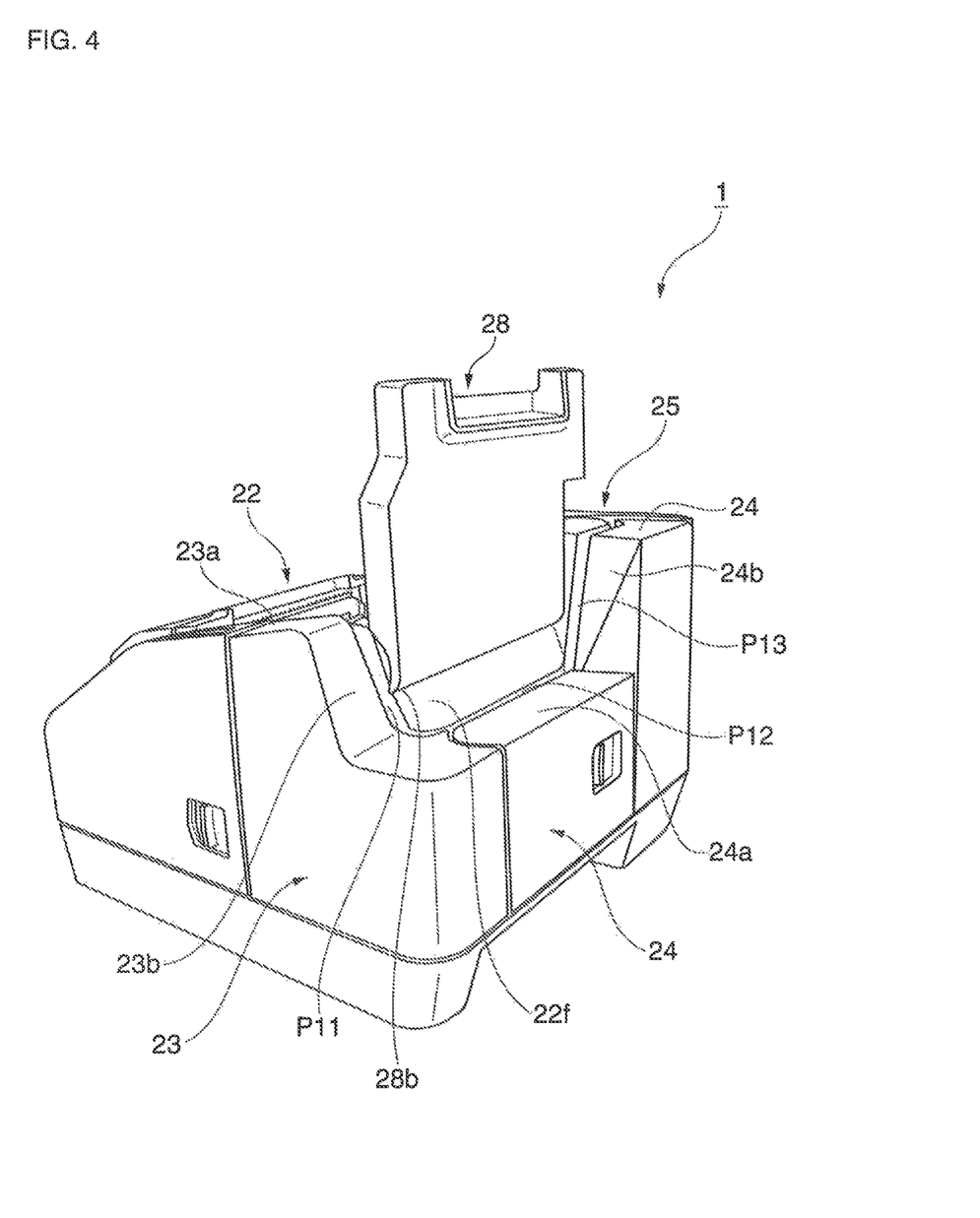
FIG. 4 is an oblique view of the multifunction printing device in FIG. 1 with the rear cover open.

The external appearance of the multifunction printer 1 is described next with reference to FIG. 1 and FIG. 2 to FIG. 4. FIG. 2 is an oblique view from above the front left side of the multifunction printer 1 when the two covers disposed at the top of the printer are open, FIG. 3 is an oblique view of the multifunction printer 1 from diagonally above the front, and FIG. 4 is an oblique view from above the rear right side of the multifunction printer a when the rear cover is open.

As shown in these figures, the printer case 1a of the multifunction, printer 1 includes a rectangular bottom case 21 of a uniform thickness on the bottom, an inside case 22 on top, and a rigs case 23, rear case 24, and left case 25 disposed on the right side, back, and left side of the inside case 22 with specific gaps therebetween. The top of the multifunction printer 1 is the top surface of these parts 22 to 25 located at the top side on the vertical axis Z. The check conveyance path P1, which has a U-shaped configuration open to the front when seen in plan view, is defined by the vertical channel of a specific depth formed between the inside case 22 and the right case 23, rear case 24, and left case 25. A wide entry pocket 4 that is open to the top and front is formed in the front part of the space between the inside case 22 and right case 23 on the longitudinal axis, and a wide exit pocket 5 that is open to the top is formed in the front part of the space between the inside case 22 and left case 25.

The check conveyance path P1 includes an upstream-side conveyance path part P11 that extends straight on the longitudinal axis between the inside case 22 and right case 23; a downstream-side conveyance path part P13 that extends straight from the back to the front of the printer with a slight incline to the inside between the inside case 22 and left case 25; and a rear conveyance path part P12 that extends straight widthwise to the printer between the downstream end of the upstream-side conveyance path part P11 and the upstream end of the downstream-side conveyance path part P13 between the inside case 22 and rear case 24.

A card slot 26 that extends straight on the longitudinal axis is formed in the top part of the right case 23 in this embodiment. This card slot 26 is a slot for reading magnetic information from an identification card, for example. A magnetic reader not shown disposed inside the card slot 26 reads the magnetic information when the user inserts and removes the card from the card slot 26.

A straight card slot 27 is also formed in the top of the inside case 22 near the exit pocket 5 as shown in FIG. 2 and FIG. 3. This card slot 27 is a straight slot that continues from the downstream end of the downstream-side conveyance path part P13, is positioned on an extension of the downstream-side conveyance path part P13, and is inclined slightly toward the widthwise center of the printer. When a driver license or other card is inserted to the card slot 27 from the front, the card is detected by an internal sensor not shown, and the inserted card is fed toward the downstream-side conveyance path part P13. Before the fed card is returned to the card slot 27, image information on the front and back sides is captured by an optical reading unit 8 that is disposed to the downstream-side conveyance path part P13 for scanning checks.

A roll paper compartment cover 28 and ink cartridge unit cover 29 are disposed to the top of the inside case 22. The roll paper compartment cover 28 can open from the closed position shown in FIG. 1 to a substantially vertical position shown in FIG. 2 pivoting on an axis of rotation that extends widthwise to the printer at the back of the printer. When the roll paper compartment cover 28 is opened, the roll paper compartment 11 formed inside the inside case 22 opens to the top, and the paper roll R can be replaced.

The ink cartridge unit cover 29 can open from the closed position shown in FIG. 1 to the open position shown in FIG. 2 pivoting on an axis of rotation that extends widthwise to the printer at the front side of the printer. When the ink cartridge unit cover 29 is opened, the ink cartridge unit 29a formed inside the inside case 22 opens to the top, and the ink cartridge 29b can be replaced.

The drive unit 13c of the automatic cutter 13 is disposed behind the ink cartridge unit 29a. Maintenance of the automatic cutter 13 is thus simplified because the drive unit 13c of the automatic cutter 13 is also exposed when the ink cartridge unit cover 29 is opened.

The continuous paper exit 14 formed in the top of the inside case 22 is defined by the distal edge of the roll paper compartment cover 28 and the distal edge of the ink cartridge unit cover 29. As shown in FIG. 2, the platen roller 12b of the continuous paper print unit 12 and the fixed knife 13a of the automatic cutter 13 are disposed to the distal end of the roll paper compartment cover 28. As a result, when the roll paper compartment cover 28 opens, the continuous paper conveyance path P2 opens and continuous paper pulled from the paper roll can be easily set in the continuous paper conveyance path P2.

A flat operating panel 22a that slopes slightly to the front of the printer is disposed at the left corner at the back end of the inside case 22. An operating button 22b and a plurality of LED units 22c for displaying the operating status are arrayed in the operating panel 22a. As will be understood from FIG. 1, a power switch 22d is located at the bottom right part of the front of the printer.

The entry pocket 4 of the multifunction printer 1 according to this embodiment of the invention is thus open to the top on the vertical axis Z and the front on the longitudinal axis Y, the exit pocket 5 is open to the top on the vertical axis Z, and the continuous paper exit 14 opens to the top from the top of the printer. Roll paper can be loaded into the roll paper compartment 11 from the front of the printer by opening the roll paper compartment cover 28, and an ink cartridge 29b can be loaded to the ink cartridge unit 29a from the front by opening the ink cartridge unit cover 29. The operating panel 22a can also be operated from the front. More specifically, the operator can perform most operations from the front looking at the top of the printer, and no operations require looking at the sides or back of the device. In addition, because the drive unit 13c of the automatic cutter 13 is exposed when the ink cartridge unit cover 29 is opened, maintenance of these parts can be done from the front. The multifunction printer 1 is therefore very easy to use and operate, and is extremely user-friendly.

Check Processing Unit

Figure 6:
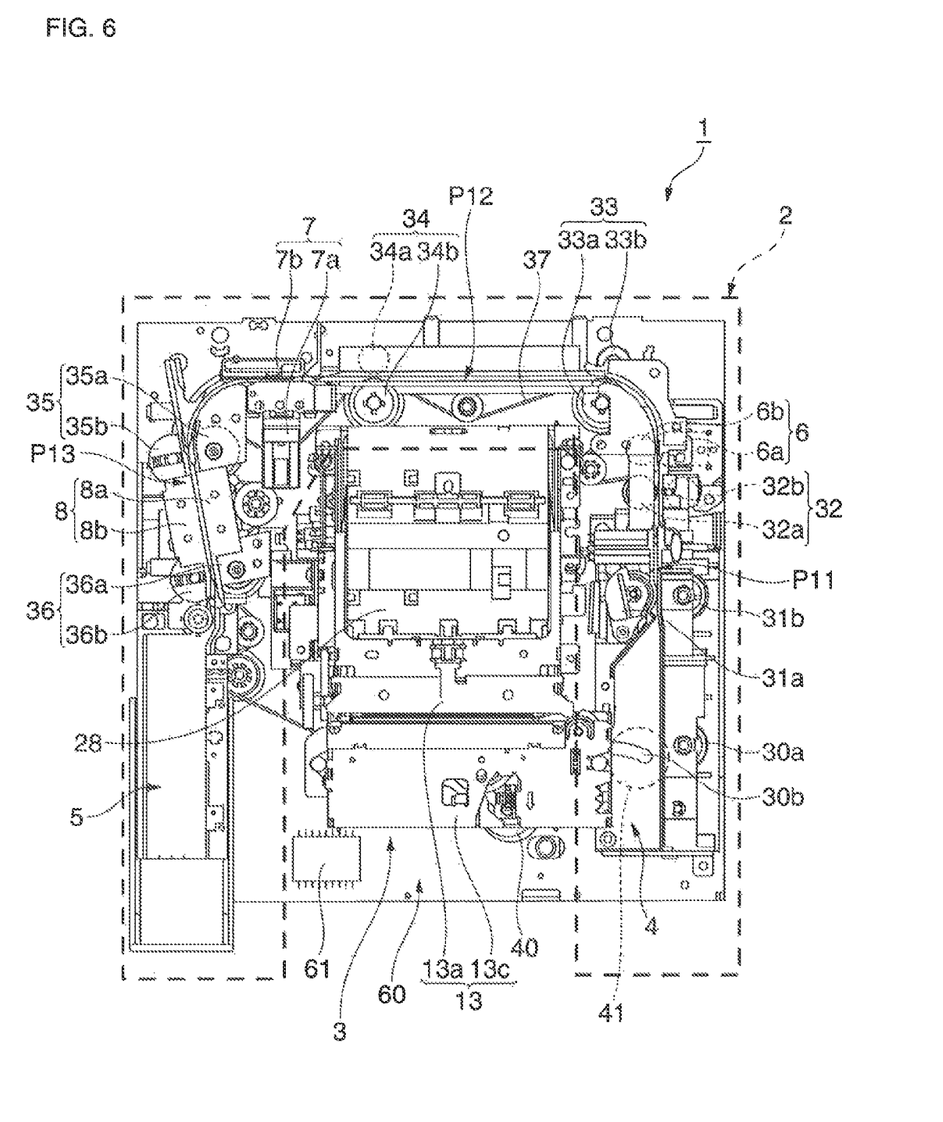
FIG. 6 shows the internal configuration of the multifunction printing device in FIG. 1.

FIG. 6 shows the configuration of the check processing unit 2, and the internal configuration of the check processing unit 2 is described below referring primarily to FIG. 6.

A paper feed roller 30a is disposed to the side of the entry pocket 4 of the check processing unit 2 on the right case 23 side, and a pressure member 30b is disposed to the side on the inside case 22 side. The pressure member 30b presses the checks S1 inserted to the entry pocket 4 to the paper feed roller 30a side. The checks S1 are fed into the upstream-side conveyance path part P11 of the check conveyance path P1 by the paper feed roller 30a, which is driven by the feed motor 41. In this example the checks S1 are inserted upright to the entry pocket 4 with the back facing the inside of the printer (the inside case 22 side).

A feed roller 31b that conveys checks S1 fed from the entry pocket 4, and a retard roller 31a disposed opposite the feed roller 31b with the upstream-side conveyance path part P11 therebetween, are disposed to the upstream-side conveyance path part P11 of the check conveyance path P1. The feed roller 31b is driven by the feed motor 41, and turns synchronized with the paper feed roller 30a. The retard roller 31a is urged to the feed roller 31b side, and separates the checks S1 so that the checks S1 are fed one at a time downstream in cooperation with the feed roller 31b.

A plurality of paper feed roller pairs 32 to 36 are disposed to the conveyance path portion of the check conveyance path P1 downstream from the feed roller 31b. Paper feed roller pair 32 is disposed to the upstream-side conveyance path part P11; paper feed roller pairs 33, 34 are disposed to the rear conveyance path part P12; and the remaining paper feed roller pairs 35, 36 are disposed to the downstream-side conveyance path part P13. Each of the paper feed roller pairs 32 to 36 has a drive roller 32a, 33a, 34a, 35a, 36a on the inside case 22 side, and, an opposing follower roller 32b, 33b, 34b, 35b, 36b disposed to the right case 23, rear case 24, and left case 25 side, respectively, with the check conveyance path P1 therebetween. The drive rollers 32a, 33a, 34a, 35a, 36a are rotationally driven synchronously by the drive motor 40 through an intervening endless belt 37. The follower rollers 32b, 33b, 34b, 35b, 36b are urged to the opposing drive roller 32a-36a side by an urging member not shown.

A magnetic reader 6 is disposed to the upstream-side conveyance path part P11 of the check conveyance path P1. The magnetic reader 6 includes a magnetic scanner 6a such as an MICR device capable of reading magnetic information recorded in magnetic ink on the check S1, and the magnetic scanner 6a is disposed to the right case 23 so that the magnetic reading surface thereof faces the upstream-side conveyance path part P11. A pressure roller 6b is disposed opposite the magnetic reading surface of the magnetic scanner 6a with the upstream-side conveyance path part P11 therebetween. The pressure roller 6b presses the conveyed check S1 to the magnetic reading surface of the magnetic scanner 6a so that the magnetic information can be reliably read by the magnetic scanner 6a.

A check print unit 7 that prints an endorsement on the backs of checks S1 is disposed to the continuous paper print unit 12, which continues widthwise to the printer from the downstream end of the upstream-side conveyance path part P11, at a position on the left corner side of the printer. The check print unit 7 has a line inkjet head 7a disposed with the line on the vertical axis Z and the nozzle face of the inkjet head 7a facing the rear conveyance path part P12. A platen 7b that determines the printing position of the inkjet head 7a is disposed to the rear case 24 opposite the nozzle face with the rear conveyance path part P12 therebetween. The ink supply source of the inkjet head 7a is an ink cartridge 29b (FIG. 2, FIG. 7) loaded in the ink cartridge unit 29a.

Using a line head enables making the check print unit 7 more compact than when a serial head is used. The check print unit 7 is disposed at the downstream end of the rear conveyance path part P12, or more particularly at the rear left corner part of the inside case 22. This has the advantage of easily assuring space for installing the continuous paper processing unit 3 in which the continuous paper conveyance path P2 is formed extending on the longitudinal axis inside the inside case 22.

The paper feed roller pairs 35, 36 are disposed to the downstream-side conveyance path part P13 of the check conveyance path P1, and an optical reading unit 8 that reads image information from both sides of the checks S1 is disposed to the part of the conveyance path between these paper feed roller pairs. The optical reading unit 8 includes an optical scanner 8a for reading the check face and an optical scanner 8b for reading the back of the check with the scanning surfaces facing each other and the downstream-side conveyance path part P13 therebetween.

The exit pocket 5 into which checks S1 are discharged after magnetic information reading, endorsement printing, and optical scanning processes are completed is disposed to the downstream end of the downstream-side conveyance path part. P13. The exit pocket 5 opens to the top, and checks S1 discharged into the exit pocket 5 can be removed from the top. Because the entry pocket 4 and exit pocket 5 of the check processing unit 2 are both open at the top, the user can always handle checks at a position in front of the multifunction printer 1.

Figure 7:
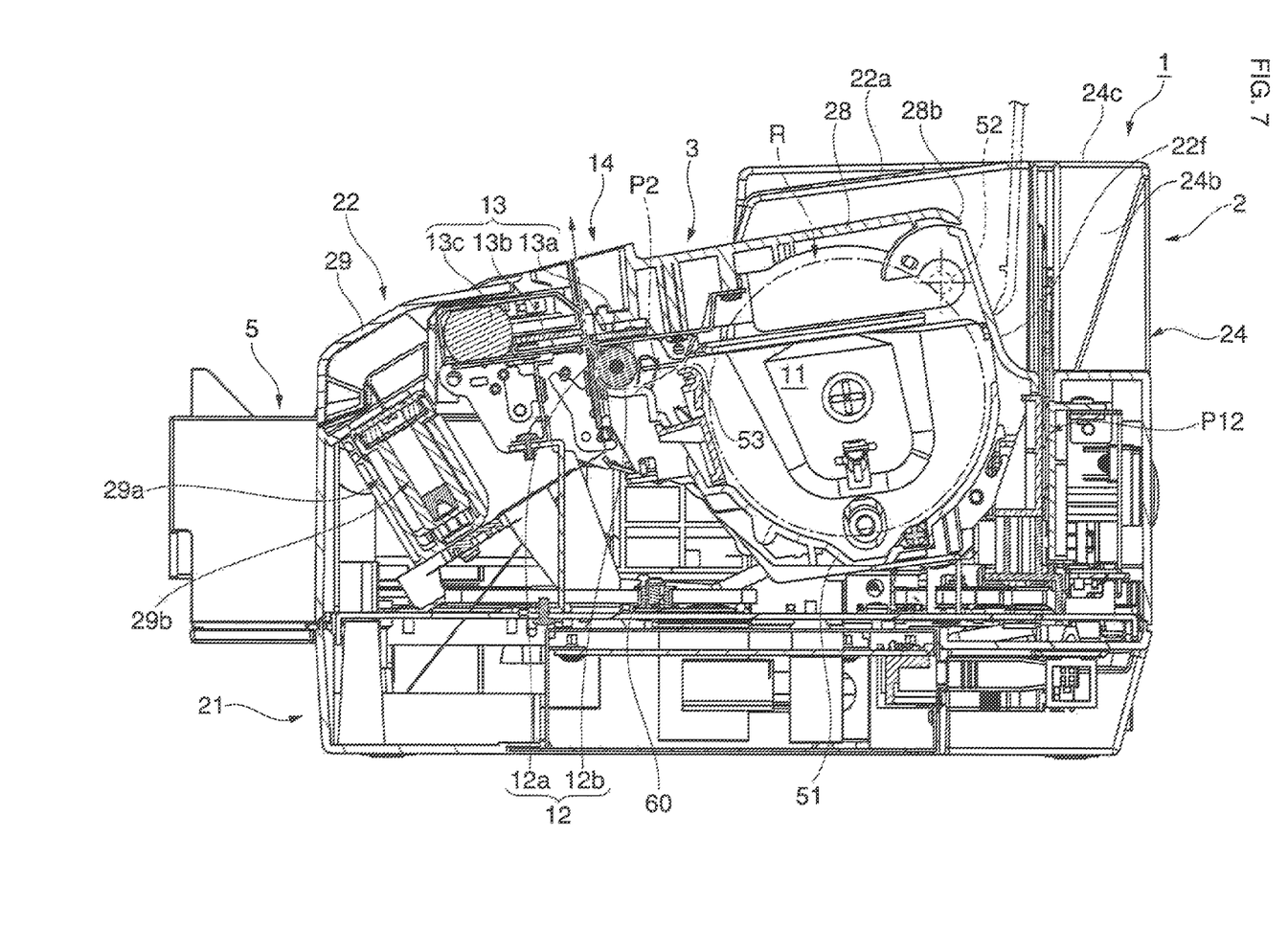
FIG. 7 is a longitudinal section view of the multifunction printing device in FIG. 1.

FIG. 7 is a vertical section view of the multifunction printer 1. As will be understood from FIG. 7 and FIG. 4, the height of the top surface of the portion of the rear conveyance path part P12 behind the roll paper compartment cover 28 is lowered to prevent interference with the roll paper compartment cover 28 when open.

More specifically, the top of the inside case 22 has a slope 22f that inclines down from the bottom of the rear edge 28b of the roll paper compartment cover 28 when closed, and one side of the rear conveyance path part P12 is formed by the end part that descends vertically from the rear end of the slope 22f. When the roll paper compartment cover 28 opens, the back end of the roll paper compartment cover 28 rotates to the back pivoting on a hinge 52 at the back end, and opens until the rear edge 28b contacts the slope 22f.

So that the part of the rear case 24 located behind the roll paper compartment cover 28 does not interfere with the roll paper compartment cover 28 when the roll paper compartment cover 28 opens, the top part 24a is set lower than the height of the top parts on both sides thereof. More specifically, the top part 24a of the rear case 24 is a flat surface of a constant height, and the right side part thereof is connected to the bottom end part of the sloped portion 23b that descends from the top part 23a of the right case 23. The left side part of the top part 24a is connected to the bottom end of the sloped part 24b that inclines upward, and the top end of the sloped part 24b is connected to the flat top part 24c located at a higher elevation.

By thus disposing the top part 24a behind the roll paper compartment cover 28 at a lower position, the roll paper compartment cover 28 does not interfere with the rear case 24 when the roll paper compartment cover 28 opens. When fully open, the roll paper compartment cover 28 is also positioned in front of the rear conveyance path part P12. Interference between checks S1 conveyed through the rear conveyance path part P12 and the roll paper compartment cover 28 can thus be avoided.

This embodiment of the invention uses the tall parts of the case on both sides of the rear conveyance path part P12 to hold the magnetic reader 6, check print unit 7, and optical reading unit 8. More specifically, the magnetic reader 6 is located at the back of the right case 23, and the check print unit 7 and optical reading unit 8 are located in the tall part of the left side of the rear case 24.

Roll Paper Processing Unit

The structure of parts of the continuous paper processing unit 3 is described next referring primarily to FIG. 7. The roll paper compartment 11 of the continuous paper processing unit 3 is formed inside the inside case 22 at the back, and holds the paper roll R so that it can roll freely with the center axis aligned with the printer width. The continuous paper conveyance path P2 that guides continuous paper S2 fed from the paper roll R to the continuous paper exit 14 extends from the roll paper compartment 11 to the front and top with the conveyance path width aligned with the printer width.

The roll paper compartment 11 has a bottom panel 51 of which the bottom is a concave curve in section view, and the top opening is covered by the roll paper compartment cover 28. The back end of the roll paper compartment cover 28 is supported by the hinge 52, the pivot axis of which extends widthwise to the printer, and the roll paper compartment, cover 28 opens and closes pivoting on this hinge 52.

The continuous paper S2 fed from the paper roll R in the roll paper compartment 11 is conveyed through the continuous paper conveyance path P2 and guided to the continuous paper exit 14. More specifically, the roll paper is guided to the front to the continuous paper print unit 12 by a paper guide 53 attached to the front edge part of the bottom panel 51. Note that freely rotating guide rollers for reducing the rolling resistance of the paper roll R could be disposed to the bottom of the roll paper compartment 11 and the paper roll R placed thereon.

The continuous paper print unit 12 includes a line thermal head 12a and a platen roller 12b that conveys while pressing the continuous paper S2 to the surface of the thermal head 12a. The thermal head 12a is disposed to the inside case 22 side, and the platen roller 12b is disposed to the roll paper compartment cover 28, in this embodiment of the invention.

An automatic cutter 13 is disposed above the continuous paper print unit 12. The automatic cutter 13 includes a fixed knife 13a and a drive unit 13c including a movable knife 13b. The fixed knife 13a is disposed on the roll paper compartment cover 28 side, and the movable knife 13b and drive unit 13c are disposed on the inside case 22 side. The continuous paper S2 passes the cutting position of the automatic cutter 13 after passing the printing position of the continuous paper print unit 12, and is discharged upward from the continuous paper exit 14, which is open to the top. Note that as shown in FIG. 1 to FIG. 3 a cutter knife 54 is disposed widthwise to the printer at the front edge of the continuous paper exit 14, enabling the operator to cut the continuous paper S2 at a desirable position.

Control System and Operation of the Multifunction Printer

Operation of the multifunction printer 1 is controlled by a control unit 61 (FIG. 6, FIG. 7) such as a MPU mounted on a circuit board 60 that is disposed on top of the bottom case 21 that supports the check processing unit 2 and continuous paper processing unit 3. Device maintenance including updating the driver is improved by controlling the multifunction printer 1 using a single control unit 61. Note that the control unit 61 may be installed as a control board attached to the back side of the circuit board 60 (the opposite side as the check conveyance path P1 side) instead of being mounted on the top of the circuit board 60 as shown in FIG. 6.

When a check S1 is inserted from above to the entry pocket 4, the control unit 61 controls the feed motor 41 and drive motor 40 of the check processing unit 2 to convey the check S1 with the paper feed roller 30a, and the checks are conveyed one by one through the upstream-side conveyance path part P11 by the retard roller 31a and feed roller 31b.

When the check S1 is conveyed through the upstream-side conveyance path part P11, the control unit 61 controls the magnetic reader 6 to read magnetic information from the check S1 and captures the magnetic information. Based on the read magnetic information, the control unit 61 then prints an endorsement on the back of the check S1 using the check print unit 7. The control unit 61 also controls the optical reading unit 8 to scan both sides of the check S1, and captures the acquired image information. The control unit 61 then discharges the scanned check S1 into the exit pocket 5 by the paper feed roller pair 36.

The check processing unit 2 of the multifunction printer 1 thus reduces the work load of the user by reading magnetic information, printing an endorsement, and scanning the check in a single continuous operation.

The control unit 61 also controls a drive motor not shown of the continuous paper processing unit 3 to rotationally drive the platen roller 12b and convey the continuous paper S2 from the paper roll R through the continuous paper conveyance path P2. As the continuous paper S2 is conveyed between the thermal head 12a and platen roller 12b, required information is printed on the continuous paper S2 as controlled by the control unit 61. The printed continuous paper S2 is then further conveyed by the platen roller 12b and discharged outside the printer from the continuous paper exit 14. When the leading printed portion of the continuous paper S2 is discharged and the trailing end of the printed portion reaches the cutting position of the automatic cutter 13, continuous paper S2 conveyance stops, the automatic cutter 13 is driven by the control unit 61 to cut across the width of the printed portion of the continuous paper S2, and a receipt of a specific length is produced.

The multifunction printer 1 thus has a check conveyance path P1 and an independent continuous paper conveyance path P2 arranged so that the printing position of the check print unit 7 is located as far as possible from the printing position of the continuous paper print unit 12 on the U-shaped check conveyance path P1 (see FIG. 6). The check processing unit 2 and continuous paper processing unit 3 are thus positioned so that operation of one is not dependent upon the operation of the other. Furthermore, because the control unit 61 is configured to control both the check processing unit 2 and continuous paper processing unit 3, the operation of both can be related in many ways. More specifically, the control unit 61 can control the relationship between the process performed by the check print unit 7 and the receipt printing process of the continuous paper print unit 12 in various ways to accomplish different processes.

For example, the control unit 61 could get magnetic information such as the amount of the check S1 read by the magnetic reader 6 of the check processing unit 2, and the control unit 61 could then command the continuous paper print unit 12 to print the magnetic information that was read.

The control unit 61 could also control discharging the continuous paper S2 from the continuous paper exit 14 simultaneously to the check S1 being discharged into the exit pocket 5. This type of control can be achieved by appropriately setting the drive speed of the drive motor 40 that drives the drive rollers 32a to 36a of the check processing unit 2, and the drive speed of the drive motor not shown that drives the platen roller 12b of the continuous paper processing unit 3. Implementing this type of control makes knowing the relationship between checks and receipts easier when a plurality of checks are processed continuously.

A multifunction printer 1 according to this embodiment of the invention can thus greatly improve ease of use for the user by controlling the relationship between check processing unit 2 and continuous paper processing unit 3 operations.

While a configuration in which the magnetic information and image information are passed to the control unit 61 is described above, the magnetic scanner 6a and the optical scanners 8a, 8b could output this information to a computer, display, or other external device. In this case, output from the external device is input to the control unit 61, and the control unit 61 may be configured to print by the check print unit 7 and continuous paper print unit 12 according to commands from the external device.

The drive motor 40 of the check processing unit 2 side and the drive motor of the continuous paper processing unit 3 side are separate motors in the foregoing embodiment, but driving the platen roller 12b of the continuous paper processing unit 3 using the drive motor 40 on the check processing unit 2 side through a speed reducer, pulley, and endless belt is obviously also possible.

Main Operational Effect of the Multifunction Printing Device According to the Invention Because the check conveyance path P1 and continuous paper conveyance path P2 are independent paths in the multifunction printer 1 according to the embodiment of the invention described above, checks S1 conveyed through the check conveyance path P1 and continuous paper S2 conveyed through the continuous paper conveyance path P2 can each be conveyed independently of each other. Checks S1 and continuous paper S2 will also not collide when conveyed simultaneously, and there is no worry about paper jams.

As shown in FIG. 5, the printing position A1 of the check print unit 7 that prints checks S1 is also set to a position farthest separated from the printing position A2 of the continuous paper print unit 12 that prints to continuous paper S2 on the check conveyance path P1. A check S1 and continuous paper S2 can therefore be printed simultaneously or with a specific time difference therebetween independently of the printing status of the other. The possibility of a conveyed check S1 and the discharged continuous paper S2 (receipt) interfering with each other and creating a paper jam can also be greatly reduced.

In addition, in the area that is enclosed by the U-shaped check conveyance path P1, the continuous paper conveyance path P2 is a conveyance path that extends toward the front of the printer, which is the open side of the U-shape. Compared with a configuration in which the continuous paper conveyance path P2 is disposed extending in line with the printer width, this configuration assures a continuous paper conveyance path P2 of sufficient length without interfering with the check conveyance path P1, and enables disposing the parts of the continuous paper processing unit 3 efficiently in the space surrounded by the U-shaped check conveyance path P1. As a result, a multifunction, printing device that is small and compact can be achieved.

As will be understood from FIG. 1 to FIG. 3, all parts of the multifunction printer 1 can be operated from a position above the front of the printer. Operability is superior, and the ease of such tasks as replacing the roll paper or changing the ink cartridge is better, than a configuration in which the operator must move to the side or back of the device, or reach around the side or back of the printer.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The invention claimed is:

1. A multifunction printing device comprising:
 a slip processing unit that processes slips;
 a continuous paper processing unit that processes continuous paper; and
 a device case in which the slip processing unit and the continuous paper processing unit are disposed;
 the slip processing unit comprising
  an entrance pocket in which the slips to be processed are loaded,
  an exit pocket to which the slips are discharged after processing,
  a slip conveyance path with a U-shaped conveyance track that guides the slips from the entrance pocket to the exit pocket, the conveyance track defining a longitudinal axis that extends parallel to legs of the U-shape, and
  disposed to the slip conveyance path, a magnetic reading unit that reads magnetic information from the slips, a slip print unit that prints on the slips, and an optical reading unit that reads an image of each of the slips;
 the continuous paper processing unit comprising
  a continuous paper exit from which the continuous paper is discharged after processing, and
  a roll paper compartment for housing the continuous paper, a continuous paper print unit that prints to continuous paper fed for processing from a paper roll stored in the roll paper compartment, and a continuous paper conveyance path that guides the continuous paper fed from the roll paper compartment past a printing position of the continuous paper print unit to the continuous paper exit;
 the continuous paper processing unit being substantially surrounded by the slip conveyance path such that a width of the continuous paper is discharged from the continuous paper exit substantially perpendicularly to the longitudinal axis of the U-shape;
 wherein the continuous paper conveyance path is formed with a conveyance direction of the continuous paper from the roll paper compartment to the continuous paper exit substantially parallel to the longitudinal axis of the U-shape of the slip conveyance path, and is an independent conveyance path that shares no conveyance path parts with the slip conveyance path;
 wherein when the device is set in a normal position on a level surface, the longitudinal axis of the U-shape is parallel to the level surface, a direction parallel to the level surface and perpendicular to the longitudinal axis is the transverse axis, and a direction perpendicular to the level surface is the vertical axis, the entrance pocket and the exit pocket are both open at a top portion of the device case with respect to the vertical axis, the slip conveyance path is defined by a conveyance channel of a specific depth that is open at the top portion of the device case, the continuous paper exit is open at the top portion of the device case, and the roll paper compartment is open at the top portion of the device case when a roll paper compartment cover attached to the top portion of the device case is opened;
 wherein at least one of the slip print unit and the continuous paper print unit has an inkjet head, an ink tank loading unit to which an ink tank that stores ink supplied to the inkjet head is installed is disposed on a front side of the continuous paper conveyance path, and the ink tank loading unit is open at the top portion of the device case when an ink tank loading unit cover attached to the-top portion of the device case is opened; and
 wherein the roll paper compartment cover is an access cover disposed on the top portion of the device case that can open by pivoting at a back side thereof, the ink tank loading unit cover is an access cover disposed on the top portion of the device case that can open by pivoting at a front side thereof, and the continuous paper exit is formed between an edge of a front side of the roll paper compartment cover and an edge of a back side of the ink tank loading unit cover.

2. The multifunction printing device described in claim 1, wherein:
 an automatic cutter for cutting the continuous paper across the width thereof is disposed along the continuous paper conveyance path at a position between the continuous paper exit and the continuous paper print unit; and
 a drive unit of the automatic cutter is exposed when the ink tank loading unit opens.

3. The multifunction printing device described in claim 1, wherein:
 the slip conveyance path has an upstream-side conveyance path part that extends from the entrance pocket to a base of the U-shape at a position on one side of the roll paper compartment along the transverse axis,
 a downstream-side conveyance path part that extends from the exit pocket to the base of the U-shape at a position on the other side of the roll paper compartment along the transverse axis, and
 a rear conveyance path part that forms the base of the U-shape and that extends parallel to the transverse axis from a downstream end of the upstream-side conveyance path part to an upstream end of the downstream-side conveyance path part;
 a height of the device at a rear part of the device case where the rear conveyance path part is formed behind the roll paper compartment cover is sufficiently short such that the rear part of the device case a height that does not interfere with the roll paper compartment cover when fully open; and
 a position of the roll paper compartment cover when fully open is set to not interfere with a slip passing through the rear conveyance path part.

4. The multifunction printing device described in claim 3, wherein:
 the magnetic reading unit, the slip print unit, and the optical reading unit are spaced apart along the transverse axis from the top portion of the device case where the roll paper compartment cover is positioned when fully open.

5. The multifunction printing device described in claim 4, wherein:
 the magnetic reading unit is disposed to the upstream-side conveyance path part;

the slip print unit is disposed to the downstream end part of the rear conveyance path part; and the optical reading unit is disposed to the downstream-side conveyance path part.

6. The multifunction printing device described in claim 1, wherein:

the slip print unit and the continuous paper print unit each have a line printhead.

7. The multifunction printing device described in claim 1, wherein:

a first card slot of a specific depth extending parallel to the longitudinal axis for a magnetic reader is formed in the top portion of the device case on an exterior side of the entrance pocket; and a second card slot for scanning cards that feeds a card to a reading position of the optical reading unit on the downstream-side conveyance path part is formed in the top portion of the device case on an inside the exit pocket.

8. A multifunction printing device comprising:

a slip processing unit that processes slips, the slip processing unit comprising a slip conveyance track that guides slips from an entrance pocket to an exit pocket;

a continuous paper processing unit that processes continuous paper, the continuous paper processing unit comprising a continuous paper conveyance track that is completely separate from the slip processing unit conveyance track, a continuous paper exit from which the continuous paper is discharged after processing, an ink tank loading unit to which an ink tank that stores ink for printing on the continuous paper is installed, and an automatic cutter for cutting the continuous paper across a width thereof; and a device case in which the slip processing unit and the continuous paper processing unit are disposed, the device case comprising an ink tank access cover disposed on the top portion of the device case that can open by pivoting at a front side thereof;

wherein a drive unit of the automatic cutter is exposed when the ink tank access cover is opened.

* * * * *